(12) United States Patent
Chappel et al.

(10) Patent No.: US 8,948,039 B2
(45) Date of Patent: Feb. 3, 2015

(54) PACKET COLLISIONS AND IMPULSIVE NOISE DETECTION

(71) Applicant: QUALCOMM Incorporated, San Diego, CA (US)

(72) Inventors: John Chappel, Mississauga (CA); Brian J. Langlais, Almonte (CA); Joubin Karimi, Kanata (CA); Richard D. Roze, Toronto (CA); Son Binh Cam, Scarborough (CA); Din Lee, Toronto (CA); Ehab Tahir, Mississauga (CA)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 13/710,968

(22) Filed: Dec. 11, 2012

(65) Prior Publication Data

US 2014/0160953 A1 Jun. 12, 2014

(51) Int. Cl.
*G06F 11/00* (2006.01)
*H04L 1/00* (2006.01)
*H04L 12/26* (2006.01)
*H04L 1/20* (2006.01)

(52) U.S. Cl.
CPC ............. *H04L 43/00* (2013.01); *H04L 1/0002* (2013.01); *H04L 1/203* (2013.01)
USPC .......................................... 370/252; 370/254

(58) Field of Classification Search
CPC ........ H04L 1/0002; H04L 43/00; H04L 1/203
USPC ......................................... 370/252, 253, 254
See application file for complete search history.

(56) References Cited

U.S. PATENT DOCUMENTS

| | | | |
|---|---|---|---|
| 6,877,043 B2 | 4/2005 | Mallory et al. | |
| 7,050,419 B2 | 5/2006 | Azenkot et al. | |
| 7,315,967 B2 | 1/2008 | Azenko et al. | |
| 2007/0189471 A1 | 8/2007 | Suzuki | |
| 2009/0238316 A1 | 9/2009 | Seo et al. | |
| 2012/0033619 A1* | 2/2012 | Corral | 370/329 |
| 2012/0033682 A1* | 2/2012 | Corral | 370/476 |
| 2012/0093240 A1 | 4/2012 | McFarland et al. | |
| 2013/0128937 A1* | 5/2013 | Somichetty et al. | 375/224 |
| 2013/0191117 A1* | 7/2013 | Atti et al. | 704/226 |

FOREIGN PATENT DOCUMENTS

EP 2270998 A1 1/2011

OTHER PUBLICATIONS

"PCT Application No. PCT/US2013/071405 International Search Report and Written Opinion", Mar. 6, 2014, 10 pages.

* cited by examiner

*Primary Examiner* — Chuong T Ho
(74) *Attorney, Agent, or Firm* — DeLizio Gilliam, PLLC

(57) ABSTRACT

A method includes determining a first Signal-to-Noise Ratio (SNR) average for a first symbol set of at least one or more first symbols in one or more packets. The method includes determining a second SNR average for a second symbol set of at least one or more second symbols in the one or more packets. The method also includes determining a first difference between the first SNR average and the second SNR average. In response to determining that the first difference exceeds an SNR threshold, the method includes determining that a first channel event has occurred in the one or more packets at least within the first symbol set and the second symbol set and in response to determining that the first channel event has occurred, determining is to remain at the first data rate or at a second data rate that is higher than the first data rate.

33 Claims, 10 Drawing Sheets

PACKET COLLISIONS AND IMPULSIVE NOISE DETECTION

BACKGROUND

Embodiments of the inventive subject matter generally relate to the field of communications, and, more particularly, to packet collisions and impulsive noise in data communications.

Different types and levels of noise can be introduced in data communications along different media (e.g., power lines). This noise can be measured by a receiver that is receiving the data communications. For example, the receiver can measure the Signal-To-Noise Ratio (SNR) of the data communications. This SNR information can be used to dynamically adjust the tone map in order to optimize performance and track changing channel conditions for the particular media.

Packet collisions, impulsive noise, and non-impulsive noise can result in a lowering of the SNR of the data communications. Packet collisions can occur when more than one transmitter transmits a data packet at essentially the same time on shared media. This results in two packets colliding with each other, thereby causing errors in the data communications of these packets. Impulsive noise can include a sudden high power burst in the time domain. The duration of this impulsive noise can vary from a few microseconds to a number of milliseconds. Also, impulsive noise may or may not be periodic. In contrast, non-impulsive noise can have peaks and valleys in the frequency domain and generally does not exhibit sudden bursts in the time domain (as described for the impulsive noise). In response to detecting any of one of packet collisions, impulsive noise, or non-impulsive noise, conventional approaches typically lower the rate of the data communications in order to increase the SNR of the data communications.

SUMMARY

In some embodiments, a method includes determining a first Signal-to-Noise Ratio (SNR) average for a first symbol set of at least one or more first symbols in one or more packets. The method includes determining a second SNR average for a second symbol set of at least one or more second symbols in the one or more packets. The method also includes determining a first difference between the first SNR average and the second SNR average. In response to determining that the first difference exceeds an SNR threshold, the method includes determining that a first channel event has occurred in the one or more packets at least within the first symbol set and the second symbol set and in response to determining that the first channel event has occurred, determining is to remain at the first data rate or at a second data rate that is higher than the first data rate.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
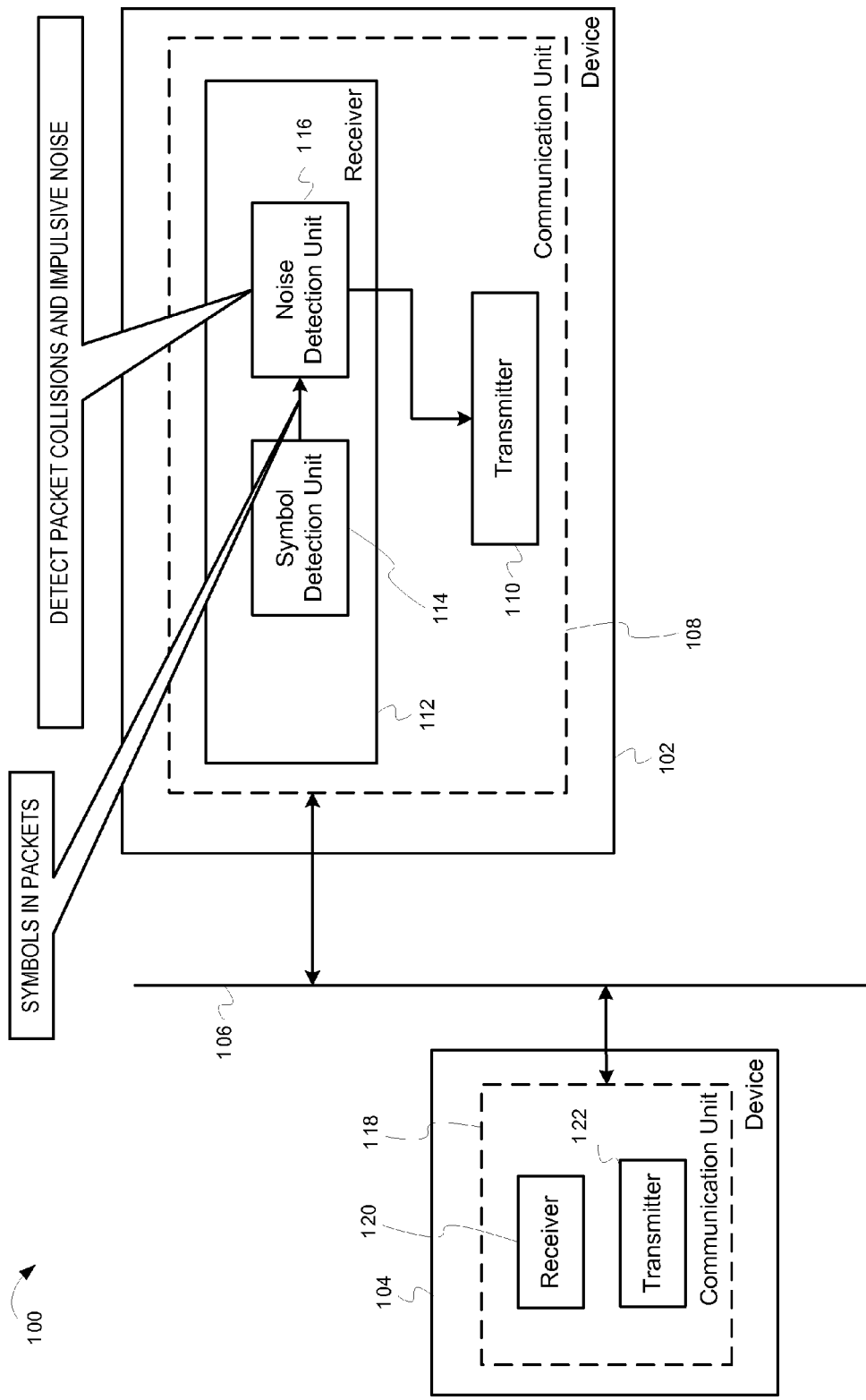
FIG. 1 depicts a block diagram of a system for detection of packet collisions and impulsive noise in a data transmission, according to some embodiments.

The description that follows includes exemplary systems, methods, techniques, instruction sequences and computer program products that embody techniques of the present inventive subject matter. However, it is understood that the described embodiments may be practiced without these specific details. For instance, although examples refer to power line communications, embodiments are applicable to any type of data communication. In other instances, well-known instruction instances, protocols, structures and techniques have not been shown in detail in order not to obfuscate the description.

Various embodiments described herein may provide an increase in performance of data communications (e.g., data rate) over techniques provided by conventional communication systems. For example, some embodiments may differentiate between a noisy channel (non-impulsive noise) for which a performance downgrade may be desirable (e.g., data rate reduction) and packet collisions and impulsive noise (short noise bursts) for which a performance downgrade may not be necessary. All three conditions (noisy channel, packet collisions, and impulsive noise) can lower the SNR for the transmission channel. However, by identifying the cause of the lowering of the SNR, appropriate response may be taken to increase the performance of the data communications. For example, if the lowering of the SNR is caused by packet collisions or impulsive noise, no performance downgrade (e.g., lowering of the data rate) may be necessary. Rather, other adjustments can be made to avoid or minimize the packet collisions and/or impulsive noise. In one embodiment, a transmitter transmitting the data packet can make an adjustment to the communications to resolve, arbitrate, etc. with other transmitters that are sending packets that are colliding with the data packet being transmitted. In one embodiment, a transmitter transmitting the data packet can make an adjustment to the timing of its data transmission to avoid the impulsive noise. In some embodiments, if the lowering of the SNR is caused by non-impulsive noise (i.e., not caused by packet collisions or impulsive noise), the data rate for the data communications can be lowered.

In some embodiments, the receiver can track the SNRs on a per symbol (rather than per packet) basis. In some embodiments, the receiver can use programmable thresholds and filters to identify sudden changes in SNRs levels (increases and decreases) which are indicative of packet collisions and/or impulsive noise. A packet collision occurs when more than one packet is transmitted on the communication media at the same time. Packet collisions can result in SNR degradation and loss of data. In some embodiments, packet collisions can be detected by monitoring SNR changes from one symbol to the next. A packet collision can be reported when a difference in average SNRs between two consecutive symbols is above a certain threshold. Additionally, SNR averaging can be done over two or more symbols (as opposed to a single symbol). Hence SNR differences can be compared between consecutive groups of two (or more) symbols at a time. Averaging over more than one symbol can work better in limiting false detects and providing better detection when symbol SNR change is more gradual. In some embodiments, each packet can have one or more symbols. Each symbol can include a fixed number of time domain samples plus an optional prefix length (which is the number of samples copied from the back of the symbol to the front). In some embodiments, samples in each symbol can be generated by creating an inverse Fast Fourier Transform (FFT) of fixed length of Orthogonal Frequency Division Multiplexing (OFDM) subcarriers that are loaded with data point modulations. Data can be split and carried over multiple symbols. However, some packets may be carrying known data or no data at all.

FIG. 1 depicts a block diagram of a system for detection of packet collisions and impulsive noise in a data transmission, according to some embodiments. In particular, FIG. 1 depicts a system 100 that includes a device 102 that is communicatively coupled to a device 104 through communication media 106. The communications between the devices 102 and 104 can be wired or wireless. For example, the communication media 106 can be a power line, air, coaxial cable, telephone line, etc. The devices 102 and 104 can be network devices (e.g., a personal computer (PC), a laptop, a netbook, a mobile phone, a personal digital assistant (PDA), or other electronic devices).

The device 104 can include a communication unit 118. The communication unit 118 can include a transmitter 122 and a receiver 120. The device 102 includes a communication unit 108. The communication unit 108 can include a transmitter 110 and a receiver 112. In this example, the transmitter 122 in the device 104 transmits data packets that may include a number of symbols to the receiver 112 in the device 102.

The receiver 112 can include a symbol detection unit 114 and a noise detection unit 116. The symbol detection unit 114 can detect the symbols in data packets received on the communication media 106. The symbol detection unit 114 can provide the symbols to the noise detection unit 116. As further described below, using symbols in the packets, the noise detection unit 116 can include functionality for detecting packet collisions and impulsive noise on the communication media 106 on which the packets are transmitted. For example, impulsive noise can include a sudden high power burst in the time domain. The duration of this impulsive noise can vary from a few microseconds to a number of milliseconds. Also, impulsive noises may or may not be periodic. In contrast, non-impulsive noise can have peaks and valleys in the frequency domain and generally does not exhibit sudden bursts in the time domain. The noise detection unit 116 can identify short impulsive noises having durations as small as microseconds that can span at most one or two symbols.

In some embodiments, the noise detection unit 116 can detect packet collisions and impulsive noise based on the number of channel events in a packet (or multiple packets). A channel event can be defined as occurring in a packet(s) if a difference between the SNR average for a first set of symbols and the SNR average for a second set of symbols exceeds an SNR threshold. The detection is also based on how close the channel events are within the packet(s). In particular, the number of symbols between channel events is compared to an event threshold to detect packet collisions and impulsive noise. A typical packet collision can occur when both transmitters transmit at a same time. When the transmissions are of different length, the SNR can improve in the longer transmission after the duration of the shorter transmission. In situations where the packet collisions occur when the transmission are at different times, the noise detection unit 116 can differentiate a packet collision from impulsive noise based on the duration of the channel event. If the time is equivalent to a valid transmission size, the noise detection unit 116 may determine that there was a packet collision. A more detailed description in reference to FIGS. 2-9 is set forth below for this differentiation based on the number of channel events and how close together the channel events are within the packet(s). Also, as will be further described below, the noise detection unit 116 can perform different operations that are dependent on whether packet collisions and impulsive noise are detected.

Figure 2:
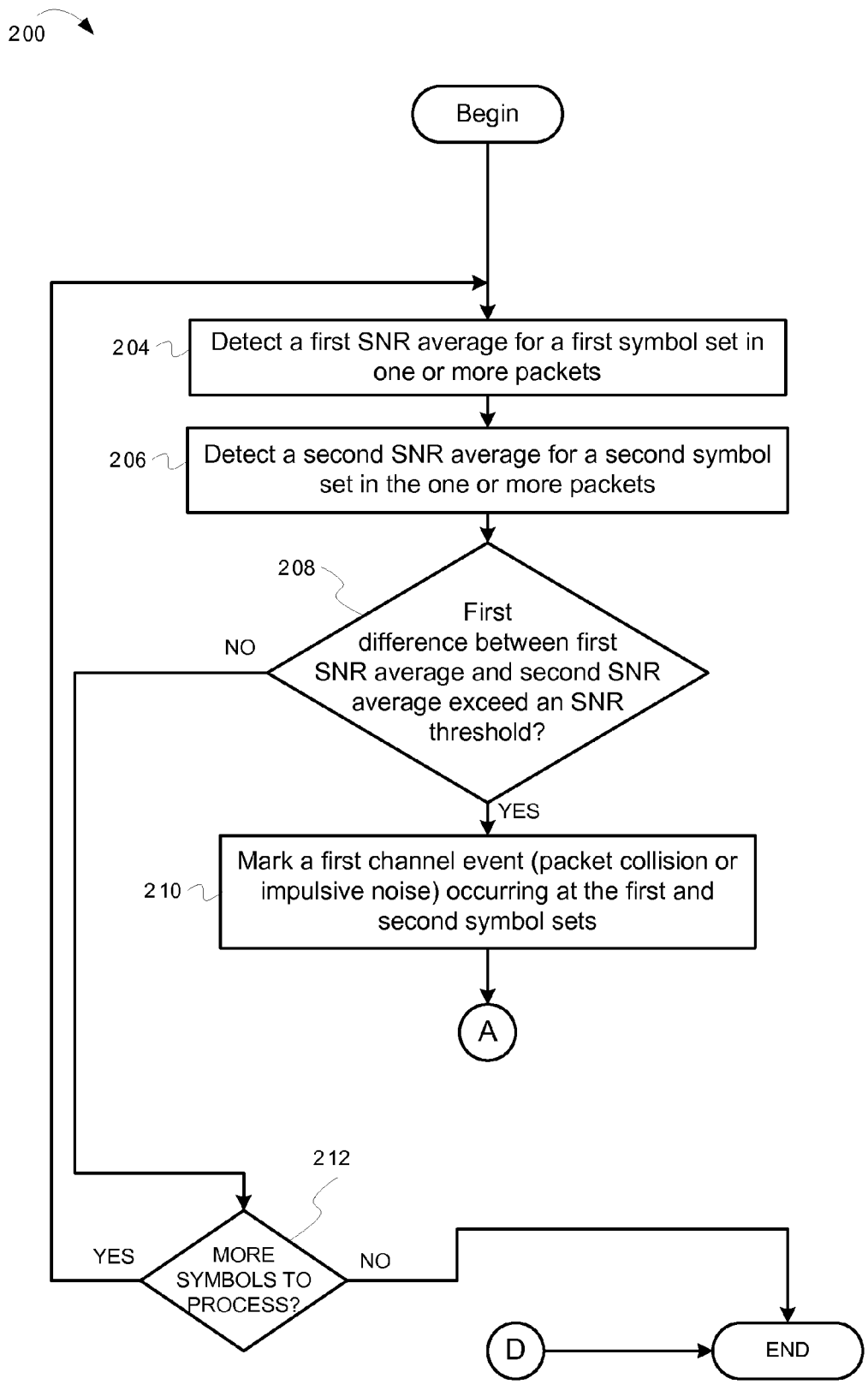
FIGS. 2-4 depict flowcharts illustrating example operations for detection of packet collisions and impulsive noise in a data transmission, according to some embodiments.
Figure 3:
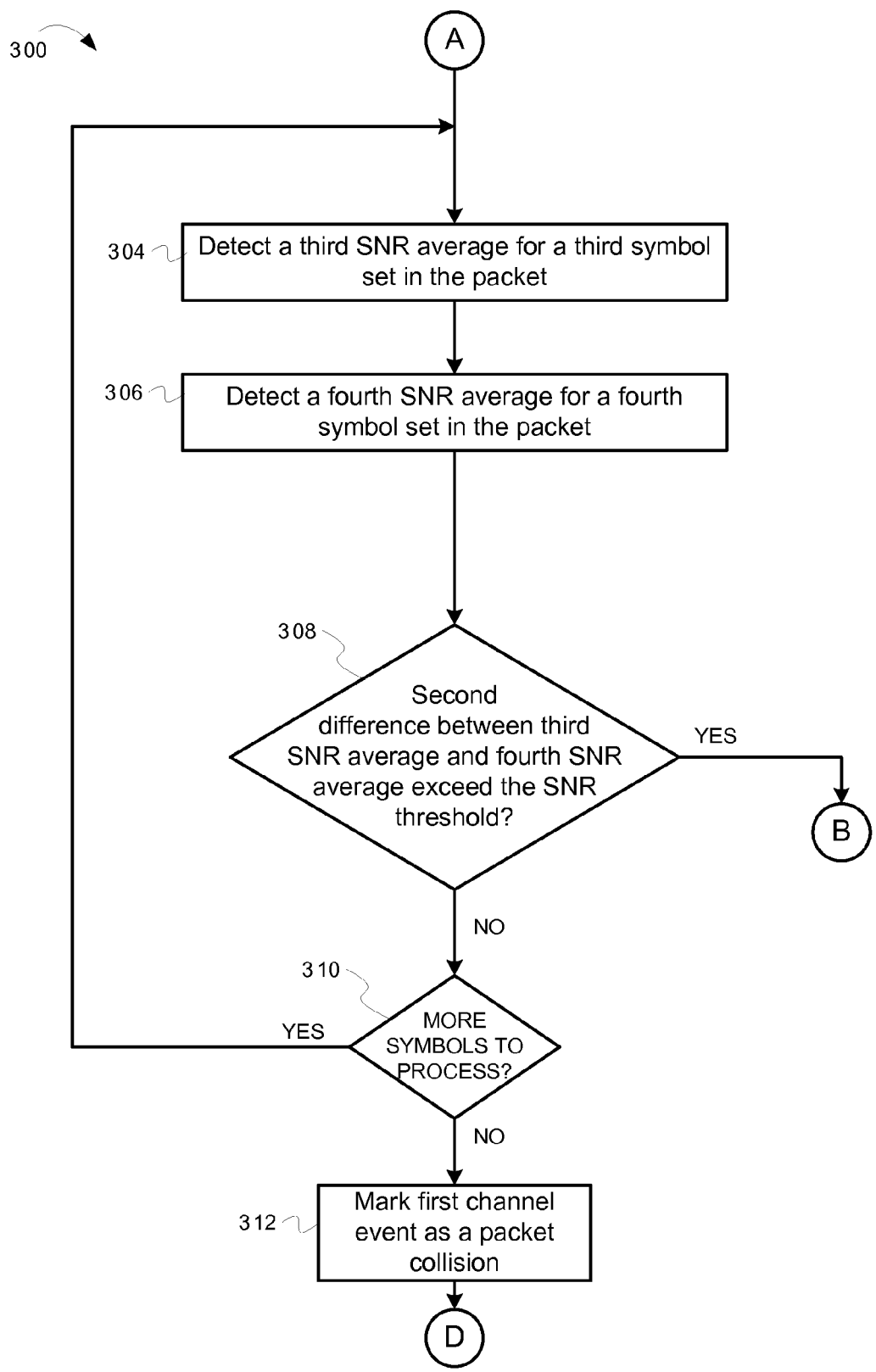
Figure 4:
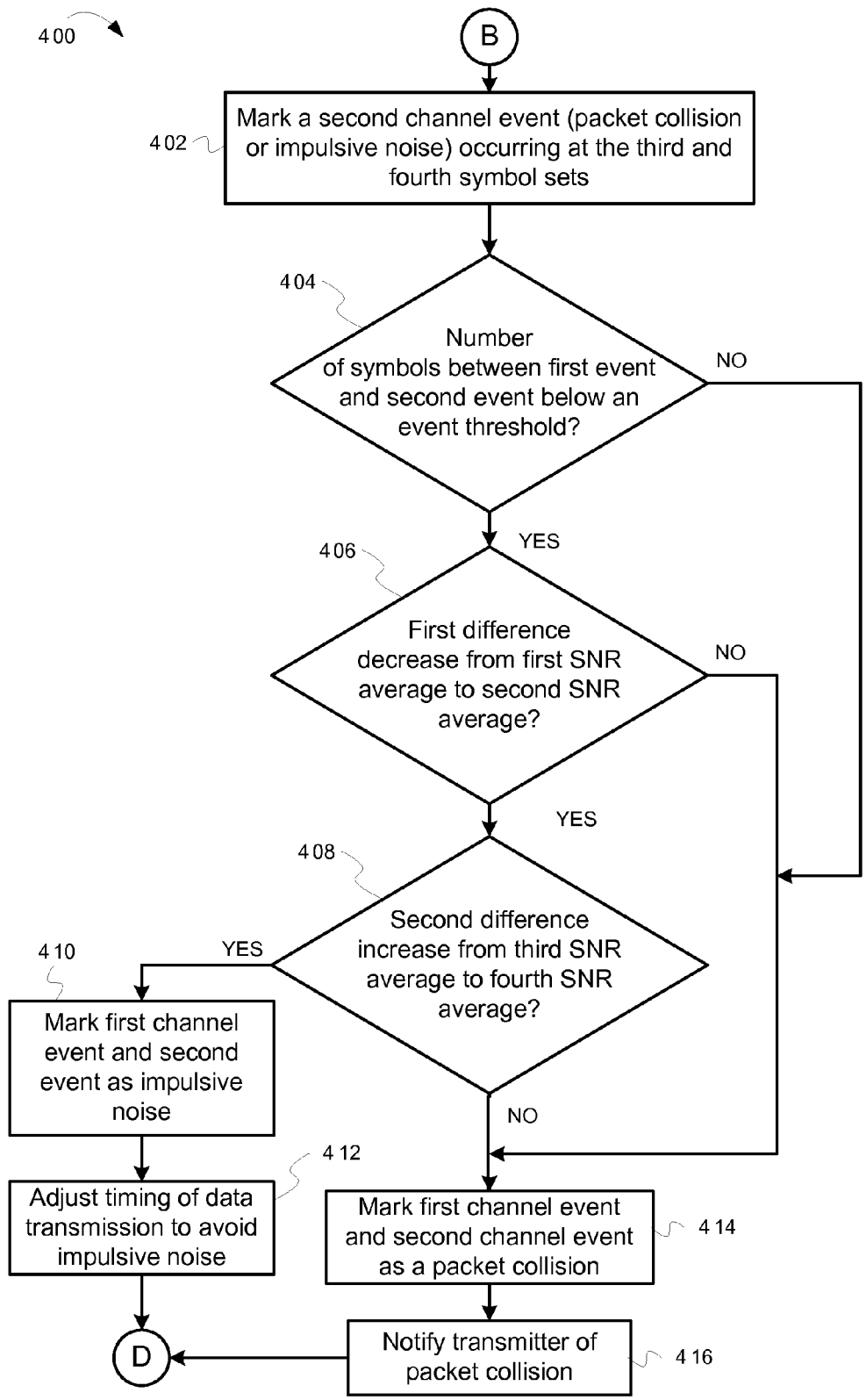

FIGS. 2-4 depict flowcharts illustrating example operations for detection of packet collisions and impulsive noise in a data transmission, according to some embodiments. The operations of a flowchart 200, a flowchart 300, and a flowchart 400 are described in reference to FIG. 1 and FIGS. 5-9. The operations of the flowchart 200, the flowchart 300, and the flowchart 400 are performed together and continue among each other as defined by transition points A, B, and D. The operations of the flowcharts 200-400 may be performed by the components depicted in FIG. 1. Also, the operations of the flowcharts 200-400 are described in reference to the examples of symbols in packet(s) that illustrate a packet collision and impulsive noise depicted in FIGS. 5-9. The operations of the flowcharts 200-400 begin at block 204 of FIG. 2.

Figure 5:
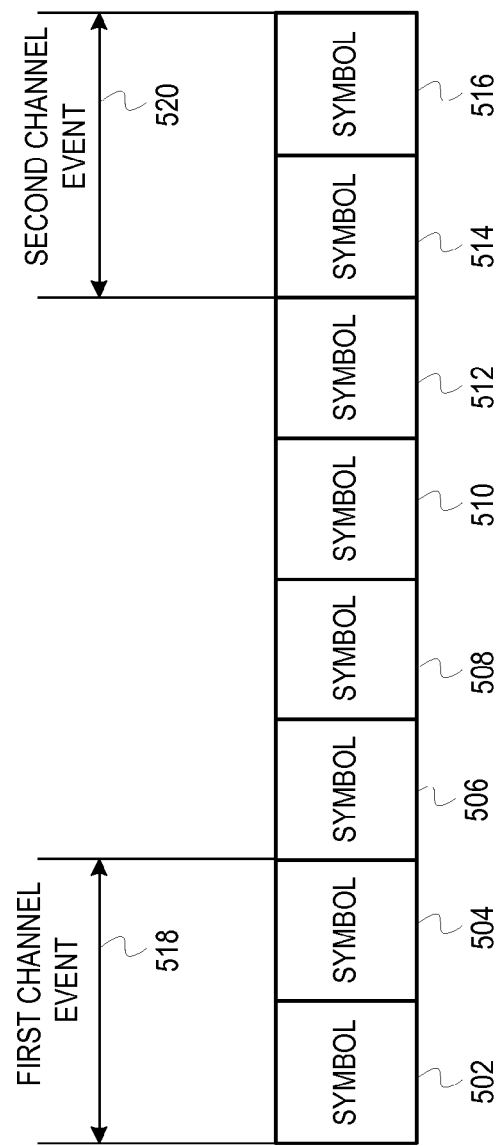
FIG. 5 illustrates example symbols in packet(s) that can include packet collisions and/or impulsive noise, according to some embodiments.

At block 204, the noise detection unit 116 detects a first SNR average for a first symbol set in the one or more packets received. A symbol set can include one or more symbols. Accordingly, the noise detection unit 116 can monitor the SNR average for the symbols in a symbol set. To illustrate, FIG. 5 illustrates example symbols in packet(s) that can include packet collisions and/or impulsive noise, according to some embodiments. FIG. 5 includes a number of symbols that can be in a same data packet or across multiple data packets. The number of symbols includes a symbol 502, a symbol 504, a symbol 506, a symbol 508, a symbol 510, a symbol 512, a symbol 514, and a symbol 516. In this example, the first symbol set includes one symbol—the symbol 502. Second, third, and fourth symbol sets are also one symbol. The second symbol set includes the symbol 504. The third symbol set includes the symbol 514. The fourth symbol set includes the symbol 516. In some embodiments, the first symbol set and the second symbol set are symbols that are in consecutive order in the data transmission. In some embodiments, the third symbol set and the fourth symbol set are also symbols that are in consecutive order in the data transmission. As further described below, a first channel event 518 is detected at the symbols 502-504 because of the difference between the SNR average for the symbol 502 and the SNR average for the symbol 504 exceeds an SNR threshold. In one embodiment, the SNR threshold is selected to be large enough so not to trigger on non-impulsive noise while providing sufficient sensitivity to sense packet collisions and impulsive noise. The SNR threshold indicates a channel event and can be a value that can vary depending on the type of communication media, type of communication, etc. In some embodiments, the SNR threshold is set to an initial base setting (e.g., 3.5 dB) that can then be calibrated. For example, if packet collisions and impulsive noise are being detected too often, the SNR threshold can be increased. However, if no packet collisions or impulsive noise are being detected and the data rates are falling as a result of packet errors, the threshold can be reduced. A second channel event 520 is detected at the symbols 514-516 because of the difference between the SNR average for the symbol 514 and the SNR average for the symbol 516 exceeds an SNR threshold. A channel event can include a packet collision, an impulsive noise or any other type of noise that is considered temporary or transient. FIG. 5 depicts that a channel event occurred based on differences in the SNR average between two consecutive symbols. However in some embodiments, a channel event occurs based on differences in the SNR average between two symbols sets, wherein each symbol set includes multiple symbols. Also while illustrated such that two consecutive symbols are compared to determine whether a channel event occurred, in some embodiments, the symbols are not required to be consecutive. FIG. 5 also depicts a number of symbols between the first channel event 518 and the second channel event 520. In this example, there are four symbols between the first channel event 518 and the second channel event 520—a symbol 506, a symbol 508, a symbol 510, and a symbol 512. Returning to the flowchart 200, operations of the flowchart 200 continue at block 206.

At block 206, the noise detection unit 116 detects a second SNR average for a second symbol set in the one or more packets. With reference to FIG. 5, the noise detection unit 116 detects an SNR average for the next symbol (the symbol 504). In other words for the example of FIG. 5, the second symbol set includes the symbol 504. Operations of the flowchart 200 continue at block 208.

At block 208, the noise detection unit 116 determines whether a difference between first SNR average and second SNR average exceed the SNR threshold. The SNR threshold can be a number of different values (as described above). If the difference between the first SNR average and the second SNR average does not exceed the SNR threshold, operations of the flowchart 200 continue at block 212. Otherwise, operations of the flowchart 200 continue at block 210.

At block 210, the noise detection unit 116 marks a first channel event occurring at the first and second symbol sets. The first channel event can be either a packet collision with other packets being transmitted on the communication media or impulsive noise. As further described below, some embodiments determine whether the first channel event is a packet collision or an impulsive noise. Accordingly, this change in the SNR average for these two symbol sets is not considered non-impulsive noise for the one or more packets that are being processed. Operations of the flowchart 200 continue at transition point A, which continues at transition point A of the flowchart 300 of FIG. 3.

At block 212, the noise detection unit 116 determines whether there are more symbols to process. In particular, the noise detection unit 116 may be evaluating the symbols in a packet or group of packets regarding the decrease in the SNR average. If there are other symbols in the packet or group of packets that have not yet been processed, the noise detection unit 116 processes a next group of symbol sets. For example, the noise detection unit 116 can continue to detect and compare the SNR average for the next two consecutive symbols in the packet or group of packets until the SNR threshold is exceeded. If the SNR threshold is not exceeded between two consecutive symbols across the one or more packets and there are no more symbols to process, the noise detection unit 116 determines that the decrease in the SNR average is not caused by packet collisions and/or impulsive noise. Therefore, if the SNR is not exceeded and there are no more symbols to process for the packet or group of packets, operations of the flowcharts 200-400 are complete along this path. Otherwise, if there are more symbols to process, operations of the flowchart 200 return to block 204 where the SNR average of two additional symbols sets are compared to determined if the SNR threshold is exceeded.

The flowchart 300 is now described. Operations of the flowchart 300 begin at the transition point A, which continues at block 304.

At block 304, the noise detection unit 116 detects a third SNR average for a third symbol set in one or more packets in the data transmission. Accordingly, after detecting the first channel event, the noise detection unit 116 begins processing subsequent symbol sets to locate a second channel event in the packet or group of packets. Returning to the example in FIG. 5, after detection of the first channel event 518 (described above), the noise detection unit 116 then attempts to locate the second channel event 520. In this example, the third symbol set includes the symbol 514. Operations of the flowchart 300 continue at block 306.

At block 306, the noise detection unit 116 detects a fourth SNR average for a fourth symbol set in the one or more packets. With reference to FIG. 5, the noise detection unit 116 detects an SNR average for the symbol 516. In other words for the example of FIG. 5, the second symbol set includes the symbol that follows the third symbol set (the symbol 514) in consecutive order. Operations of the flowchart 300 continue at block 308.

At block 308, the noise detection unit 116 determines whether a difference between third SNR average and fourth SNR average exceeds the SNR threshold. Accordingly, after detection of the first channel event, the noise detection unit 116 can process the next two symbol sets until the SNR average between the two exceed the SNR threshold. The SNR threshold for this operation can be the same or different from the SNR threshold that is used for comparing to the difference between the first SNR average and the second SNR average described above for block 208 of FIG. 2. Returning to the example of FIG. 5, after detection of the first channel event, the noise detection unit 116 can determine if the SNR average between subsequent symbol sets in one or more packets exceed the SNR threshold. In this example, the noise detection unit 116 compares the SNR average for the symbol 504 and the symbol 506. The noise detection unit 116 determined that the difference in their SNR averages did not exceed the SNR threshold. Accordingly, the noise detection unit 116 processes the next two symbol sets. The noise detection unit 116 compares the SNR average for the symbol 506 and the symbol 508. The noise detection unit 116 determined that the difference in their SNR averages did not exceed the SNR threshold. Accordingly, the noise detection unit 116 processes the next two symbol sets. The noise detection unit 116 compares the SNR average for the symbol 508 and the symbol 510. The noise detection unit 116 determined that the difference in their SNR averages did not exceed the SNR threshold. Accordingly, the noise detection unit 116 processes the next two symbol sets. The noise detection unit 116 compares the SNR average for the symbol 510 and the symbol 512. The noise detection unit 116 determined that the difference in their SNR averages did not exceed the SNR threshold. Accordingly, the noise detection unit 116 processes the next two symbol sets. The noise detection unit 116 compares the SNR average for the symbol 512 and the symbol 514. The noise detection unit 116 determined that the difference in their SNR averages did not exceed the SNR threshold. Accordingly, the noise detection unit 116 processes the next two symbol sets. The noise detection unit 116 compares the SNR average for the symbol 514 and the symbol 516. The noise detection unit 116 determined that the difference in their SNR averages did exceed the SNR threshold. Returning to the flowchart 300, if the difference between the first SNR average and the second SNR average does not exceed the SNR threshold, operations of the flowchart 300 continue at block 310. Otherwise, operations of the flowchart 300 continue at transition point B, which continues at transition point B in the flowchart 400.

At block 310, the noise detection unit 116 determines whether there are more symbols to process. As described above, the noise detection unit 116 may be evaluating the symbols in a packet or group of packets regarding the decrease in the SNR average. If the other symbols in the packet or group of packets that have not yet been processed, the noise detection unit 116 processes a next group of symbol sets. If the SNR threshold is not exceeded between two consecutive symbols across the packet or group of packets, the noise detection unit 116 determines that the decrease in the SNR average is not caused by packet collisions and/or impulsive noise. Therefore, if the SNR is not exceeded and there are no more symbols to process for the packet or group of packets, operations of the flowchart 300 continue at block 312. Otherwise, if there are more symbols to process, operations of the flowchart 300 return to block 304 where the SNR average of two additional symbols sets are compared to determined if the SNR threshold is exceeded (see description above regarding the traversal of the symbols to locate the second channel event).

At block 312, the noise detection unit 116 marks the first channel event as a packet collision. In particular, if only one channel event is detected over the one or more packets being processed, the noise detection unit 116 determines that the first channel event is a packet collision. Operations of the flowchart continue at transition point D, which continues at transition point D in the flowchart 200 (which complete the operations of the flowcharts 200-400 along this path).

The flowchart 400 is now described. Operations of the flowchart 400 begin at the transition point B, which continues at block 402.

At block 402, the noise detection unit 116 marks the second channel event occurring at the third and fourth symbol sets. The second channel event can be either a packet collision with other packets being transmitted on the communication media or impulsive noise. As further described below, some embodiments determine whether the second channel event is a packet collision or an impulsive noise. Accordingly, this change in the SNR average for these two symbol sets is not considered non-impulsive noise for the packet or packets that are being considered. Operations of the flowchart 400 continue at block 404.

At block 404, the noise detection unit 116 determines whether the number of symbols between the first channel event and the second channel event is below an event threshold. The event threshold can be a number of different values (e.g., one or two). In some embodiments, the event threshold can vary based on the type of communication media and the type of protocol. In some embodiments, the event threshold is set to a value that is smaller than a shortest symbol. A typical packet collision can occur when both transmitters transmit at a same time. When the transmissions are of different length, the SNR can improve in the longer transmission after the duration of the shorter transmission. In situations where the packet collisions occur when the transmission are at different times, the noise detection unit 116 can differentiate a packet collision from impulsive noise based on the duration of the SNR event. If the time is equivalent to a valid transmission size, the noise detection unit 116 may determine that there was a packet collision. Returning to the example in FIG. 5, the noise detection unit 116 determines the number of symbols between the first channel event 518 and the second channel event 520. In this example, the number of symbols is four. If the number of symbols between the first channel event and the second channel event is above the event threshold, operations of the flowchart 400 continue at block 414. If the number of symbols between the first channel event and the second channel event is below the event threshold, operations of the flowchart 400 continue at block 406.

At block 406, the noise detection unit 116 determines whether the first difference decreased from the first SNR average (of the first symbol set) to the second SNR average (of the second symbol set). In particular, the noise detection unit 116 determines whether the SNR average from the first symbol set to the second symbol set decreased. If there is a decrease, operations of the flowchart 400 continue at block 408. Otherwise, operations of the flowchart 400 continue at block 414.

At block 408, the noise detection unit 116 determines whether the second difference increased from the third SNR average (of the third symbol set) to the fourth SNR average (of the fourth symbol set). In particular, the noise detection unit 116 determines whether the SNR average from the third symbol set to the fourth symbol set increased. If there is an increase, operations of the flowchart 400 continue at block 410. Otherwise, operations of the flowchart 400 continue at block 414.

Figure 6:
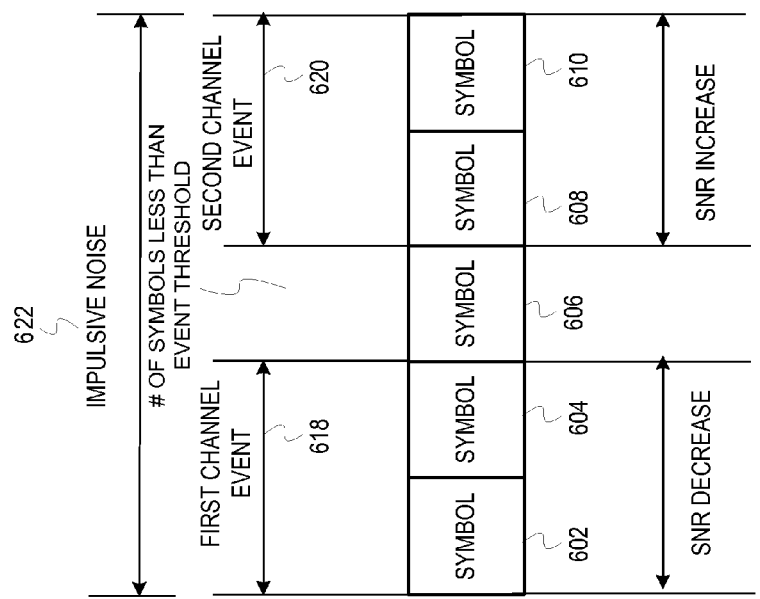
FIG. 6 depicts an example of impulsive noise.

At block 410, the noise detection unit 116 marks the first channel event and the second channel event as impulsive noise. In particular if the number of symbols between two channel events is very short (e.g., one or two symbols), the first channel event showed a drop in the SNRs, and the second channel event showed an increase in the SNRs, the noise detection unit 116 determines that an impulsive noise is causing the step change since no colliding packet can be that short. To illustrate, FIG. 6 depicts an example of impulsive noise. FIG. 6 includes a number of symbols that can be in a same data packet or across multiple data packets. The number of symbols includes a symbol 602, a symbol 604, a symbol 606, a symbol 608, and a symbol 610. In this example, the first symbol set includes the symbol 602. The second symbol set includes the symbol 604. The third symbol set includes the symbol 608. The fourth symbol set includes the symbol 610.

A first channel event 618 is detected at the symbols 602-604 because of the difference between the SNR average for the symbol 602 and the SNR average for the symbol 604 exceeds the SNR threshold. A second channel event 620 is detected at the symbols 608-610 because of the difference between the SNR average for the symbol 608 and the SNR average for the symbol 610 exceeds an SNR threshold. FIG. 6 depicts that a channel event occurred based on differences in the SNR average between two consecutive symbols. However in some embodiments, a channel event occurs based on differences in the SNR average between two symbols sets, wherein each symbol set includes multiple symbols. Also while illustrated such that two consecutive symbols are compared to determine whether a channel event occurred, in some embodiments, the symbols are not required to be consecutive.

In this example, the difference between the SNR average for the symbol 602 and the SNR average for the symbol 604 is a decrease (i.e., drop) in the SNR between the symbol 602 and the symbol 604. Also, the difference between the SNR average for the symbol 608 and the SNR average for the symbol 610 is an increase (i.e., rise) in the SNR between the symbol 608 and the symbol 610. FIG. 6 also depicts a number of symbols between the first channel event 618 and the second channel event 620. In this example, there is one symbol between the first channel event 618 and the second channel event 620—a symbol 606. In this example, the number of symbols (one) between the first channel event 618 and the second channel event 620 is less than the event threshold. The event threshold can be any number of values (e.g., one to two, less than five, less than 10, etc.) that is used to identify whether the channel events are packet collisions or just impulsive noise.

In this example, the first channel event 618 and the second channel event 620 are defined as an impulsive noise 622. In some embodiments as shown in this example, if there is an SNR decrease at the first channel event, an SNR increase at the second channel event, and the number of symbols between the two channel events is less than the event threshold, the noise detection unit 116 determines that the two channel events are impulsive noise.

Returning to the flowchart 400 of FIG. 4, after marking the first channel event and second channel event as impulsive noise at block 410, operations of the flowchart 400 continue at block 412.

At block 412, the noise detection unit 116 causes the adjusting of the timing of the data transmission to avoid the impulsive noise. In particular with reference to FIG. 1, the noise detection unit 116 can notify the transmitter 110 regarding the adjusting to avoid the impulsive noise. The transmitter 110 can adjust the timing of its data transmission on the communication media 106 to avoid the impulsive noise. For example, the transmitter 110 can avoid transmitting during certain periodic time instances. As an example, impulsive noise may be present in a current quadrant of the power line cycle where the packet transmission is occurring. In response, the transmitter 110 can change from the current quadrant to a different one of the quadrants to reduce the effects of the impulsive noise. Also, the transmitter 110 can broadcast this message to adjust the timing of a data transmission on the communication media 106 to avoid the impulsive noise. For example, the transmitter 110 can transmit this message to all other communications units that transmit data through the communication media 106. Alternatively, the transmitter 110 can transmit this message to the communication unit that transmitted the packets having symbols that were determined to have impulsive noise. For example, the transmitter 110 can then transmit this message to the device 104. The transmitter 122 can then be reconfigured to adjust its data transmission to avoid impulsive noise. This adjusting of the data transmission may or may not be specific to data transmissions to the device 102. Also, this message may or may not affect the data transmission from the transmitter 110. For example, the transmitter 110 may be reconfigured to adjust its data transmission to the device 104 through the communication media 106. Returning to the flowchart 400 of FIG. 4, operations of the flowchart 400 continue at transition point D, which continues at transition point D in the flowchart 200 (which complete the operations of the flowcharts 200-400 along this path).

At block 414, the noise detection unit 116 marks the first channel event and the second channel event as a packet collision. In particular if the number of symbols between two channel events is not short (e.g., greater than one or two symbols) or the first channel event showed an increase in the SNRs or the second channel event showed a decrease in the SNRs, the noise detection unit 116 determines that a packet collision is causing the change in the SNR between the first channel event and the second channel event.

Figure 7:
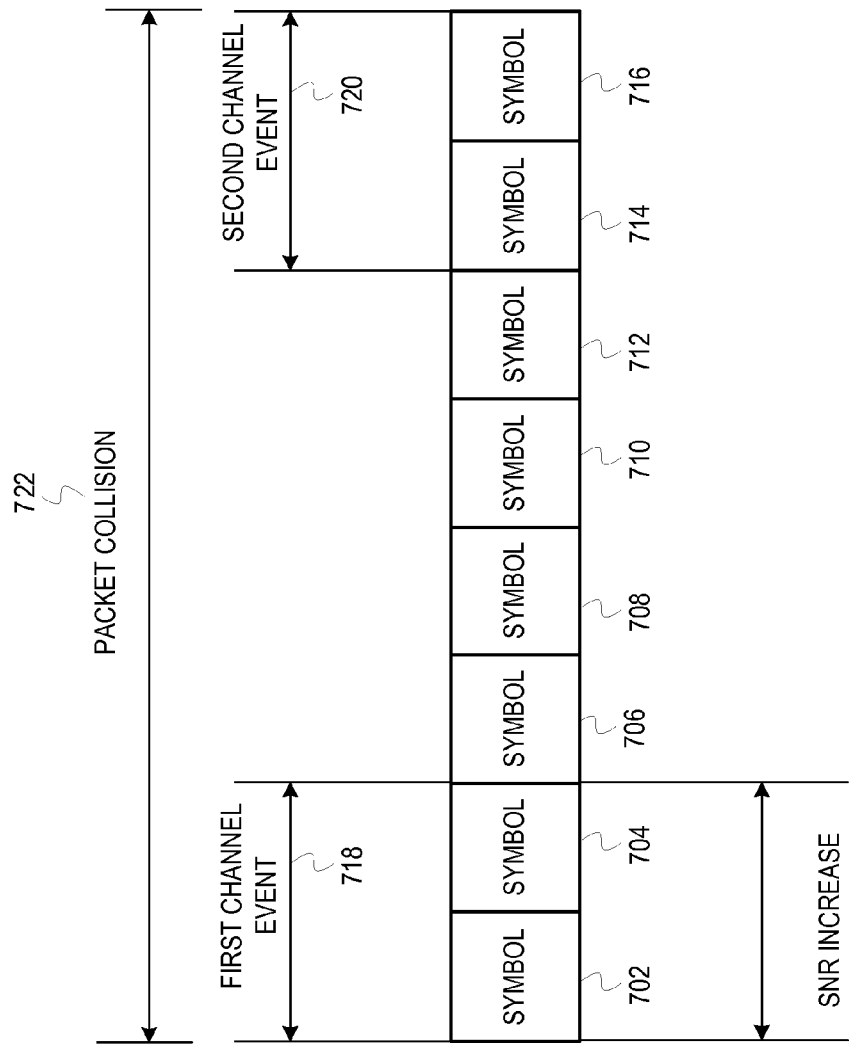
FIGS. 7-9 depict three different examples of packet collisions.
Figure 8:
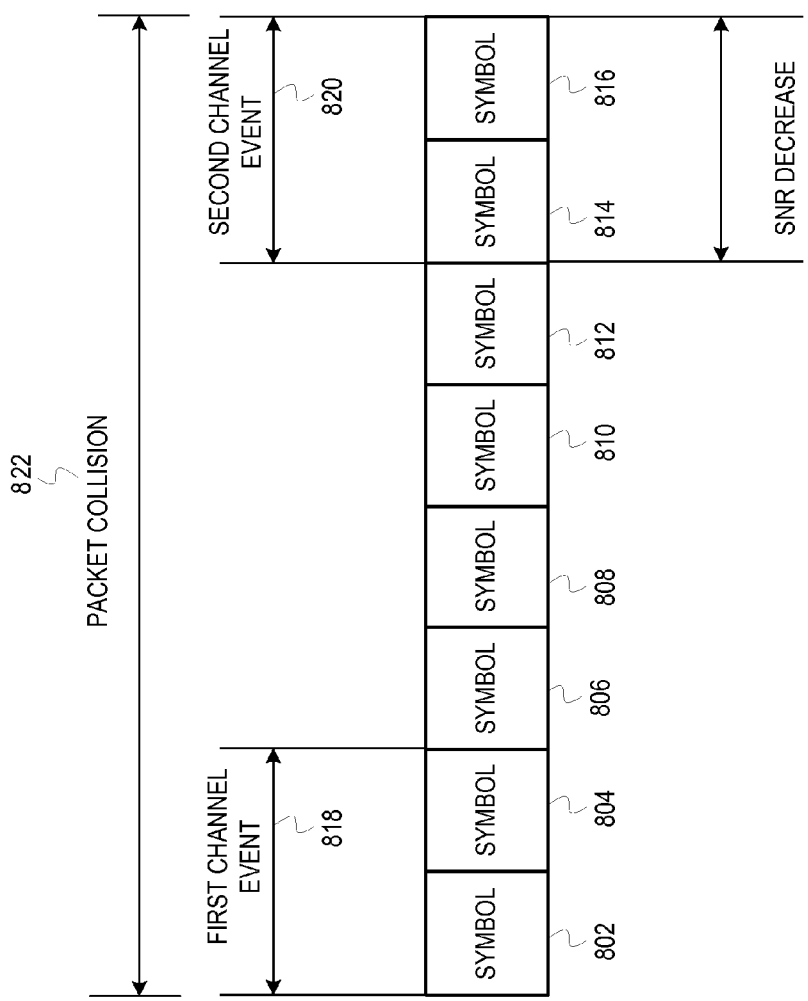
Figure 9:
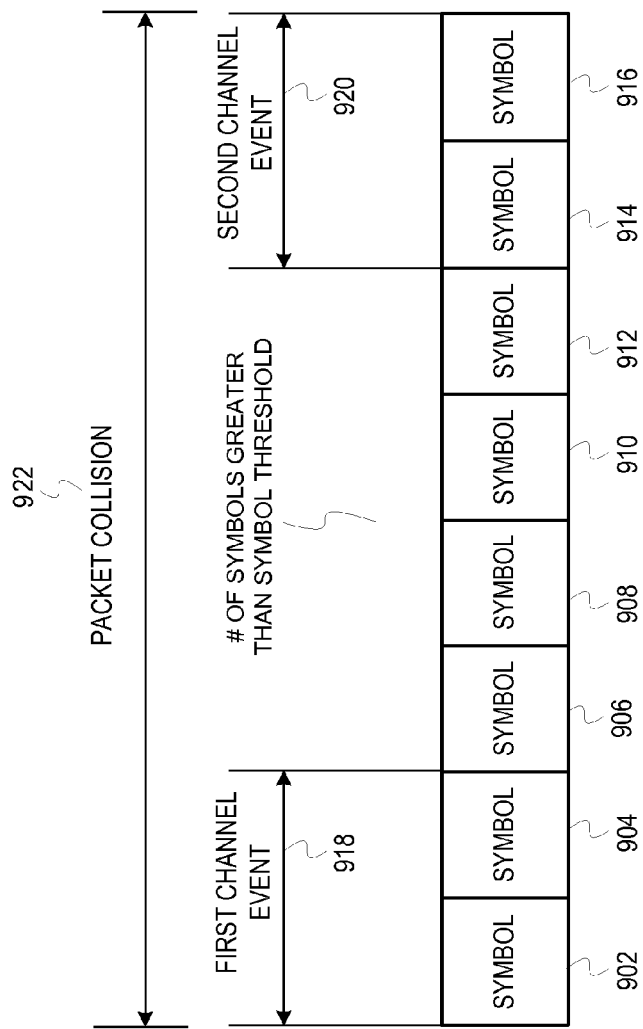

To illustrate, FIGS. 7-9 depict three different examples of packet collisions. FIG. 7 includes a number of symbols that can be in a same data packet or across multiple data packets. The number of symbols includes a symbol 702, a symbol 704, a symbol 706, a symbol 708, a symbol 710, a symbol 712, a symbol 714, and a symbol 716. In this example, the first symbol set includes the symbol 702. The second symbol set includes the symbol 704. The third symbol set includes the symbol 708. The fourth symbol set includes the symbol 710.

A first channel event 718 is detected at the symbols 702-704 because the difference between the SNR average for the symbol 702 and the SNR average for the symbol 704 exceeds the SNR threshold. A second channel event 720 is detected at the symbols 714-716 because the difference between the SNR average for the symbol 714 and the SNR average for the symbol 716 exceeds an SNR threshold. In this example, the difference between the SNR average for the symbol 702 and the SNR average for the symbol 704 is an increase (i.e., rise) in the SNR between the symbol 702 and the symbol 704. Accordingly, the first channel event and the second channel event are defined as packet collisions.

FIG. 8 includes a number of symbols that can be in a same data packet or across multiple data packets. The number of symbols includes a symbol 802, a symbol 804, a symbol 806, a symbol 808, a symbol 810, a symbol 812, a symbol 814, and a symbol 816. In this example, the first symbol set includes the symbol 802. The second symbol set includes the symbol 804. The third symbol set includes the symbol 808. The fourth symbol set includes the symbol 810.

A first channel event 818 is detected at the symbols 802-804 because the difference between the SNR average for the symbol 802 and the SNR average for the symbol 804 exceeds the SNR threshold. A second channel event 820 is detected at the symbols 814-816 because the difference between the SNR average for the symbol 814 and the SNR average for the symbol 816 exceeds an SNR threshold. In this example, the difference between the SNR average for the symbol 814 and the SNR average for the symbol 816 is a decrease (i.e., drop) in the SNR between the symbol 814 and the symbol 816. Accordingly, the first channel event and the second channel event are defined as packet collisions.

FIG. 9 includes a number of symbols that can be in a same data packet or across multiple data packets. The number of symbols includes a symbol 902, a symbol 904, a symbol 906, a symbol 908, a symbol 910, a symbol 912, a symbol 914, and a symbol 916. In this example, the first symbol set includes the symbol 902. The second symbol set includes the symbol 904. The third symbol set includes the symbol 908. The fourth symbol set includes the symbol 910.

A first channel event 918 is detected at the symbols 902-904 because the difference between the SNR average for the symbol 902 and the SNR average for the symbol 904 exceeds the SNR threshold. A second channel event 920 is detected at the symbols 914-916 because the difference between the SNR average for the symbol 914 and the SNR average for the symbol 916 exceeds an SNR threshold. In this example, the number of symbols between the first channel event 918 and the second channel event 920 is greater than the event threshold. Accordingly, the first channel event and the second channel event are defined as packet collisions.

Returning to the flowchart 400 of FIG. 4, after marking the first channel event and second channel event as packet collisions at block 414, operations of the flowchart 400 continue at block 416.

At block 416, the noise detection unit 116 notifies the transmitter of the packet collision. In particular with reference to FIG. 1, the noise detection unit 116 can notify the transmitter 110 regarding the packet collision. The transmitter 110 can transmit this message to the communication unit that transmitted the packets that are colliding with other packets. For example, the transmitter 110 can transmit this message to the device 104. The transmitter 122 can then resolve, arbitrate, etc. with the other transmitters that are sending packets that are colliding with the packets from the transmitter 110. These transmitters can then resolve or arbitrate the use of the communication media. In some embodiments, in a centrally managed network, the main station or device can request that all devices in the network adjust the contention parameters to attempt to reduce the packet collisions. Accordingly, there can be a dynamic adjusting of transmission properties (e.g., contention, arbitration, etc.) based on the inferred packet collision rate. Returning to the flowchart 400 of FIG. 4, operations of the flowchart 400 continue at transition point D, which continues at transition point D in the flowchart 200 (which complete the operations of the flowcharts 200-400 along this path).

It should be understood that FIGS. 1-9 and the operations described herein are examples meant to aid in understanding embodiments and should not be used to limit embodiments or limit scope of the claims. While described such that impulsive noise and packet collisions can be detected based on two channel events, in some embodiments, more than two channel events can be used. Embodiments may perform additional operations, fewer operations, operations in a different order, operations in parallel, and some operations differently.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 10:
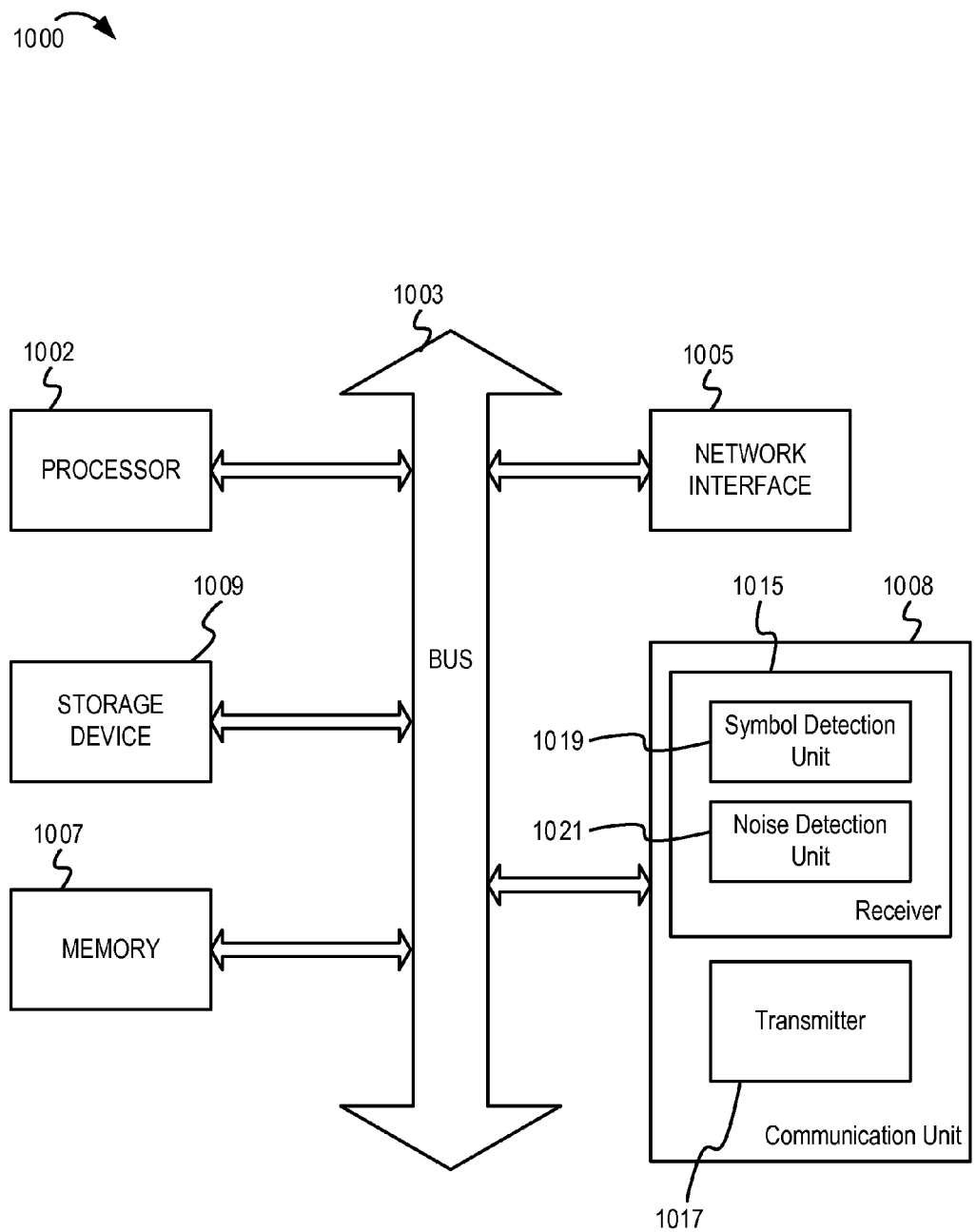
FIG. 10 depicts a block diagram of a device for detection of packet collisions and impulsive noise in a data transmission, according to some embodiments.

FIG. 10 depicts a block diagram of a device for detection of packet collisions and impulsive noise in a data transmission, according to some embodiments. In some embodiments, a device 1000 can be an electronic device (e.g., a personal computer (PC), a laptop, a netbook, a mobile phone, a personal digital assistant (PDA), or other electronic system). In other embodiments, the device 1000 can be a subsystem embedded in another electronic device (e.g., a personal computer (PC), a laptop, a netbook, a mobile phone, a personal digital assistant (PDA), or other electronic system).

The device 1000 may include a processor 1001 (possibly including multiple processors, multiple cores, multiple nodes, and/or implementing multi-threading, etc.). The device 1000 may include memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The device 1000 also may include a bus 1003 (e.g., PCI, ISA, PCI-Express, HyperTransport®, Infini-Band®, NuBus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.).

The device 1000 also includes a communication unit 1008 that includes a receiver 1015 and a transmitter 1017. The receiver 1015 includes a symbol detection unit 1019 and a noise detection unit 1021. The noise detection unit 1021 performs operations for detecting packet collisions and impulsive noise in a data transmission, as described above with reference to FIG. 1-8. Any of the functionality in the communication unit 1008 may be partially (or entirely) implemented in hardware and/or on the processor 1002. For example, the functionality may be implemented with an application specific integrated circuit, in logic implemented in the processor 1002, in a co-processor on a peripheral device or card, etc. Further, realizations may include fewer or additional components not illustrated in FIG. 10 (e.g., video cards, audio cards, additional network interfaces, peripheral devices, etc.). The processor 1002, the storage device 1009, the memory 1007, and the network interface 1005 are coupled to the bus 1003. Although illustrated as being coupled to the bus 1003, the memory 1007 may be coupled to the processor 1002.

While the embodiments are described with reference to various implementations and exploitations, it will be understood that these embodiments are illustrative and that the scope of the inventive subject matter is not limited to them. In general, techniques for detection of packet collisions and impulsive noise in a data transmission as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining a first Signal-to-Noise Ratio (SNR) average for a first symbol set of at least one or more first symbols in one or more packets received at a first network device via a communication channel at a first data rate;
   determining a second SNR average for a second symbol set of at least one or more second symbols in the one or more packets;
   determining a first difference between the first SNR average and the second SNR average;
   in response to determining that the first difference exceeds an SNR threshold,
      determining that a first channel event has occurred in the one or more packets at least within the first symbol set and the second symbol set; and
      in response to determining that the first channel event has occurred, determining to remain at the first data rate or at a second data rate that is higher than the first data rate.

2. The method of claim 1, wherein the first channel event comprises at least one of a packet collision and an impulsive noise.

3. The method of claim 2, wherein in response to determining that the first difference exceeds the SNR threshold,
   differentiating between the first channel event being the packet collision or the impulsive noise.

4. The method of claim 3, wherein differentiating between the first channel event being the packet collision or the impulsive noise comprises:
   determining a third SNR average for a third symbol set of at least one or more of third symbols in the one or more packets;
   determining a fourth SNR average for a fourth symbol set of at least one or more of fourth symbols in the one or more packets;
   determining a second difference between the third SNR average and the fourth SNR average; and
   in response to determining the second difference exceeds the SNR threshold,
      determining that a second channel event has occurred in the one or more packets.

5. The method of claim 4, further comprising:
   determining a number of symbols between the first channel event and the second channel event;
   determining whether the first difference is a decrease from the first SNR average to the second SNR average;
   determining whether the second difference is an increase from the third SNR average to the fourth SNR average; and
   in response to the number of symbols between the first channel event and the second channel event being below an event threshold and in response to the first difference being the decrease and in response to the second difference being an increase,
      marking the first channel event and the second channel event as impulsive noise.

6. The method of claim 5, wherein the second channel event follows the first channel event.

7. The method of claim 4, further comprising:
   determining a number of symbols between the first channel event and the second channel event;
   determining whether the first difference is a decrease from the first SNR average to the second SNR average;
   determining whether the second difference is an increase from the third SNR average to the fourth SNR average; and
   in response to the number of symbols between the first channel event and the second channel event being above an event threshold or in response to the first difference being an increase or in response to the second difference being a decrease,
      marking the first channel event and the second channel event as the packet collision.

8. The method of claim 1, wherein the at least one or more first symbols is followed by the at least one or more second symbols in consecutive order.

9. A method comprising:
   determining a first Signal-to-Noise Ratio (SNR) average for a first symbol set of at least one or more first symbols in one or more packets received at a first network device via a communication channel;
   determining a second SNR average for a second symbol set of at least one or more second symbols in the one or more packets;
   determining a first difference between the first SNR average and the second SNR average; and
   in response to determining the first difference exceeds an SNR threshold,
      determining that a first channel event has occurred in the one or more packets at least within the first symbol set and the second symbol set, the first channel event comprising at least one of a packet collision and an impulsive noise.

10. The method of claim 9, wherein in response to determining the first difference exceeds the SNR threshold,
    differentiating between the first channel event being the packet collision or the impulsive noise.

11. The method of claim 10, wherein differentiating between the first channel event being the packet collision or the impulsive noise comprises:
    determining a third SNR average for a third symbol set of at least one or more of third symbols in the one or more packets;
    determining a fourth SNR average for a fourth symbol set of at least one or more of fourth symbols in the one or more packets;
    determining a second difference between the third SNR average and the fourth SNR average; and
    in response to determining the second difference exceeds the SNR threshold,
       determining that a second channel event has occurred in the one or more packets.

12. The method of claim 11, further comprising:
    determining a number of symbols between the first channel event and the second channel event;
    determining whether the first difference is a decrease from the first SNR average to the second SNR average;
    determining whether the second difference is an increase from the first SNR average to the second SNR average; and
    in response to the number of symbols between the first channel event and the second channel event being below an event threshold and in response to the first difference being a decrease and in response to the second difference being an increase,
       marking the first channel event and the second channel event as impulsive noise.

13. The method of claim 12, wherein the second channel event follows the first channel event.

14. The method of claim 11, further comprising:
determining a number of symbols between the first channel event and the second channel event;
determining whether the first difference is a decrease from the first SNR average to the second SNR average;
determining whether the second difference is an increase from the first SNR average to the second SNR average; and
in response to the number of symbols between the first channel event and the second channel event being above an event threshold or in response to the first difference being an increase or in response to the second difference being a decrease,
marking the first channel event and the second channel event as packet collisions.

15. A non-transitory machine-readable storage medium having machine executable instructions stored therein, the machine executable instructions comprising instructions to:
determine a first Signal-to-Noise Ratio (SNR) average for a first symbol set of at least one or more first symbols in one or more packets received at a first network device via a communication channel at a first data rate;
determine a second SNR average for a second symbol set of at least one or more second symbols in the one or more packets;
determine a first difference between the first SNR average and the second SNR average;
in response to a determination that the first difference exceeds an SNR threshold,
determine that a first channel event has occurred in the one or more packets at least within the first symbol set and the second symbol set; and
in response to a determination that the first channel event has occurred, determine to remain at the first data rate or at a second data rate that is higher than the first data rate.

16. The non-transitory machine-readable storage medium of claim 15, wherein the first channel event comprises at least one of a packet collision and an impulsive noise.

17. The non-transitory machine-readable storage medium of claim 16, wherein said machine-executable instructions further comprise instructions to:
in response to the determination that the first difference exceeds the SNR threshold, differentiate between the first channel event being the packet collision or the impulsive noise.

18. The non-transitory machine-readable storage medium of claim 17, wherein said machine-executable instructions to differentiate between the first channel event being the packet collision or the impulsive noise comprise instructions to:
determine a third SNR average for a third symbol set of at least one or more of third symbols in the one or more packets;
determine a fourth SNR average for a fourth symbol set of at least one or more of fourth symbols in the one or more packets;
determine a second difference between the third SNR average and the fourth SNR average; and
in response to a determination that the second difference exceeds the SNR threshold,
determine that a second channel event has occurred in the one or more packets.

19. The non-transitory machine-readable storage medium of claim 18, wherein said machine-executable instructions further comprise instructions to:
determine a number of symbols between the first channel event and the second channel event;
determine whether the first difference is a decrease from the first SNR average to the second SNR average;
determine whether the second difference is an increase from the third SNR average to the fourth SNR average; and
in response to the number of symbols between the first channel event and the second channel event being below a channel event threshold and in response to the first difference being a decrease and in response to the second difference being an increase,
mark the first channel event and the second channel event as impulsive noise.

20. The non-transitory machine-readable storage medium of claim 19, wherein the second channel event follows the first channel event.

21. The non-transitory machine-readable storage medium of claim 18, wherein said machine-executable instructions further comprise instructions to:
determine a number of symbols between the first channel event and the second channel event;
determine whether the first difference is a decrease from the first SNR average to the second SNR average;
determine whether the second difference is an increase from the third SNR average to the fourth SNR average; and
in response to the number of symbols between the first channel event and the second channel event being above a channel event threshold or in response to the first difference being an increase or the second difference being a decrease,
mark the first channel event and the second channel event as packet collisions.

22. The non-transitory machine-readable storage medium of claim 15, wherein the at least one or more first symbols is followed by the at least one or more second symbols in consecutive order.

23. A non-transitory machine-readable storage medium having machine executable instructions stored therein, the machine executable instructions comprising instructions to:
determine a first Signal-to-Noise Ratio (SNR) average for a first symbol set of at least one or more first symbols in one or more packets received at a first network device via a communication channel;
determine a second SNR average for a second symbol set of at least one or more second symbols in the one or more packets;
determine a first difference between the first SNR average and the second SNR average; and
in response to a determination the first difference exceeds an SNR threshold,
determine that a first channel event has occurred in the one or more packets at least within the first symbol set and the second symbol set, the first channel event comprising at least one of a packet collision and an impulsive noise.

24. The non-transitory machine-readable storage medium of claim 23, wherein said machine-executable instructions further comprise instructions to:
in response to the determination the first difference exceeds the SNR threshold, differentiate between the first channel event being the packet collision or the impulsive noise.

25. The non-transitory machine-readable storage medium of claim 24, wherein said machine-executable instructions to differentiate between the first channel event being the packet collision or the impulsive noise comprises instructions to:

determine a third SNR average for a third symbol set of at least one or more of third symbols in the one or more packets;
determine a fourth SNR average for a fourth symbol set of at least one or more of fourth symbols in the one or more packets;
determine a second difference between the third SNR average and the fourth SNR average; and
in response to a determination that the second difference exceeds the SNR threshold,
determine that a second channel event has occurred in the one or more packets.

26. The non-transitory machine-readable storage medium of claim 25, wherein said machine-executable instructions further comprise instructions to:
determine a number of symbols between the first channel event and the second channel event;
determine whether the first difference is a decrease from the first SNR average to the second SNR average;
determine whether the second difference is an increase from the first SNR average to the second SNR average; and
in response to the number of symbols between the first channel event and the second channel event being below an event threshold and in response to the first difference being a decrease and in response to the second difference being an increase,
mark the first channel event and the second channel event as impulsive noise.

27. The non-transitory machine-readable storage medium of claim 26, wherein the second channel event follows the first channel event.

28. The non-transitory machine-readable storage medium of claim 25, wherein said machine-executable instructions further comprise instructions to:
determine a number of symbols between the first channel event and the second channel event;
determine whether the first difference is a decrease from the first SNR average to the second SNR average;
determine whether the second difference is an increase from the first SNR average to the second SNR average; and
in response to the number of symbols between the first channel event and the second channel event being above an event threshold or in response to the first difference being an increase or in response to the second difference being a decrease,
mark the first channel event and the second channel event as packet collisions.

29. An apparatus comprising:
a network interface configured to receive one or more packets via a communication channel; and
a noise detection unit communicatively coupled to the network interface, the noise detection unit configured to:
determine a first Signal-to-Noise Ratio (SNR) average for a first symbol set of at least one or more first symbols in the one or more packets received at the network interface via the communication channel;
determine a second SNR average for a second symbol set of at least one or more second symbols in the one or more packets;
determine a first difference between the first SNR average and the second SNR average; and
in response to a determination the first difference exceeds an SNR threshold,
determine that a first channel event has occurred in the one or more packets at least within the first symbol set and the second symbol set, the first channel event comprising at least one of a packet collision and an impulsive noise.

30. The apparatus of claim 29, wherein the noise detection unit is configured to:
in response to the determination the first difference exceeds the SNR threshold, differentiate between the first channel event being the packet collision or the impulsive noise.

31. The apparatus of claim 30, wherein the noise detection unit is further configured to:
determine a third SNR average for a third symbol set of at least one or more of third symbols in the one or more packets;
determine a fourth SNR average for a fourth symbol set of at least one or more of fourth symbols in the one or more packets;
determine a second difference between the third SNR average and the fourth SNR average; and
in response to a determination that the second difference exceeds the SNR threshold,
determine that a second channel event has occurred in the one or more packets.

32. The apparatus of claim 31, wherein the noise detection unit is configured to:
determine a number of symbols between the first channel event and the second channel event;
determine whether the first difference is a decrease from the first SNR average to the second SNR average;
determine whether the second difference is an increase from the first SNR average to the second SNR average; and
in response to the number of symbols between the first channel event and the second channel event being below an event threshold and in response to the first difference being a decrease and in response to the second difference being an increase,
mark the first channel event and the second channel event as impulsive noise.

33. The apparatus of claim 31, wherein the noise detection unit is configured to:
determine a number of symbols between the first channel event and the second channel event;
determine whether the first difference is a decrease from the first SNR average to the second SNR average;
determine whether the second difference is an increase from the first SNR average to the second SNR average; and
in response to the number of symbols between the first channel event and the second channel event being above an event threshold or in response to the first difference being an increase or in response to the second difference being a decrease,
mark the first channel event and the second channel event as packet collisions.

* * * * *